United States Patent
Kim et al.

(10) Patent No.: US 10,339,296 B2
(45) Date of Patent: *Jul. 2, 2019

(54) TERMINAL APPARATUS AND CONTROL METHOD FOR TERMINAL APPARATUS

(71) Applicant: LG ELECTRONICS INC., Seoul (KR)

(72) Inventors: Jihwan Kim, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 201 days.

This patent is subject to a terminal disclaimer.

(21) Appl. No.: 15/326,479

(22) PCT Filed: Jul. 22, 2014

(86) PCT No.: PCT/KR2014/006653
§ 371 (c)(1),
(2) Date: Jan. 14, 2017

(87) PCT Pub. No.: WO2016/013693
PCT Pub. Date: Jan. 28, 2016

(65) Prior Publication Data
US 2018/0211030 A1    Jul. 26, 2018

(51) Int. Cl.
*G06F 21/32* (2013.01)
*G06F 21/45* (2013.01)

(52) U.S. Cl.
CPC .............. *G06F 21/45* (2013.01); *G06F 21/32* (2013.01)

(58) Field of Classification Search
USPC .......................................................... 726/18
See application file for complete search history.

(56) References Cited

U.S. PATENT DOCUMENTS 6,819,219 B1 * 11/2004 Bolle .................... G06F 21/32
340/5.52
7,526,110 B2 * 4/2009 Niinuma ............ G06K 9/00087
283/68
(Continued)

FOREIGN PATENT DOCUMENTS

EP          1530949 A1 *  5/2005  ......... G06K 9/00026
JP       2007272352        10/2007
(Continued)

OTHER PUBLICATIONS

PCT International Application No. PCT/KR2014/006653, Written Opinion of the International Searching Authority dated Mar. 25, 2015, 13 pages.

*Primary Examiner* — Taghi T Arani
*Assistant Examiner* — Badridot Champakesanatusptodotgov
(74) *Attorney, Agent, or Firm* — Lee, Hong, Degerman, Kang & Waimey

(57) ABSTRACT

A terminal apparatus and a control method are disclosed. The terminal apparatus comprises: an input part for receiving a fingerprint; a control part for performing an authentication procedure with respect to the input fingerprint; and a display part for outputting a notification message if fingerprint authentication with respect to the input fingerprint is completed, wherein the control part sets a fingerprint authentication cancellation mode if contact of the fingerprint lasts for a first predetermined time or more after the fingerprint authentication was completed and can cancel authentication of the fingerprint if a predetermined condition is met.

20 Claims, 10 Drawing Sheets

(56) References Cited

U.S. PATENT DOCUMENTS

| | | | | |
|---|---|---|---|---|
| 7,840,034 | B2* | 11/2010 | Takahashi | G06F 21/32 |
| | | | | 382/116 |
| 8,242,881 | B2* | 8/2012 | Uno | G06K 9/00926 |
| | | | | 340/5.52 |
| 8,352,679 | B2* | 1/2013 | Wolfe | G06F 12/0808 |
| | | | | 711/118 |
| 8,943,326 | B2* | 1/2015 | Tamkhane | G06F 21/78 |
| | | | | 713/186 |
| 8,983,143 | B2* | 3/2015 | Abiko | G06K 9/00006 |
| | | | | 382/115 |
| 9,043,941 | B2* | 5/2015 | Yamada | G06F 21/32 |
| | | | | 726/28 |
| 9,098,735 | B2* | 8/2015 | Cho | G06K 9/00087 |
| 9,119,539 | B1* | 9/2015 | Dotan | A61B 5/02438 |
| 9,143,506 | B2* | 9/2015 | Duncan | G06F 21/32 |
| 9,432,366 | B2* | 8/2016 | Apostolos | H04L 63/0861 |
| 9,619,635 | B2* | 4/2017 | Takagi | H04L 63/0861 |
| 2006/0078177 | A1* | 4/2006 | Niinuma | G06K 9/00087 |
| | | | | 382/124 |
| 2008/0201768 | A1* | 8/2008 | Koo | G06F 21/34 |
| | | | | 726/6 |
| 2008/0201771 | A1* | 8/2008 | Ueda | H04L 9/3231 |
| | | | | 726/7 |
| 2009/0037743 | A1* | 2/2009 | Narayanaswami | |
| | | | | G07C 9/00158 |
| | | | | 713/186 |
| 2009/0146779 | A1* | 6/2009 | Kumar | G06K 9/00885 |
| | | | | 340/5.31 |
| 2011/0310044 | A1* | 12/2011 | Higuchi | G06F 1/1684 |
| | | | | 345/173 |
| 2012/0092293 | A1* | 4/2012 | Ganapathi | G02B 26/0833 |
| | | | | 345/174 |
| 2013/0129162 | A1* | 5/2013 | Cheng | G06F 21/32 |
| | | | | 382/124 |
| 2013/0298224 | A1* | 11/2013 | Heilpern | G06F 21/32 |
| | | | | 726/19 |
| 2013/0329967 | A1* | 12/2013 | Abiko | G06K 9/00026 |
| | | | | 382/115 |
| 2014/0007223 | A1* | 1/2014 | Han | G06F 21/32 |
| | | | | 726/16 |
| 2014/0282945 | A1* | 9/2014 | Smith | G06F 21/32 |
| | | | | 726/6 |
| 2015/0180866 | A1* | 6/2015 | Hama | G06K 9/00087 |
| | | | | 726/6 |
| 2017/0286701 | A1* | 10/2017 | Kim | G06F 21/604 |

FOREIGN PATENT DOCUMENTS

| | | |
|---|---|---|
| JP | 2007316740 | 12/2007 |
| KR | 1020100029604 | 3/2010 |
| KR | 1020140035758 | 3/2014 |
| WO | 2014057262 | 4/2014 |

* cited by examiner

FIG. 4
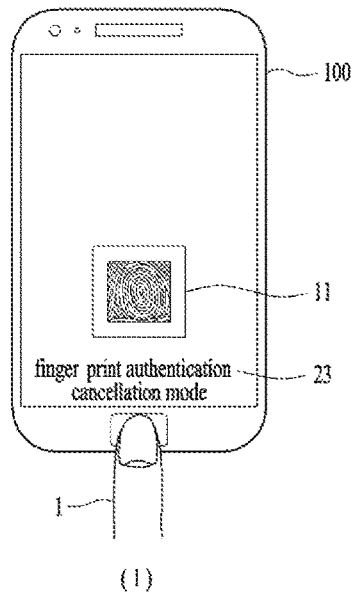
(1)
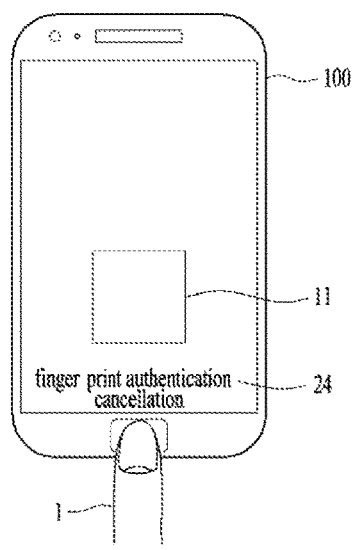
(2)

FIG. 5
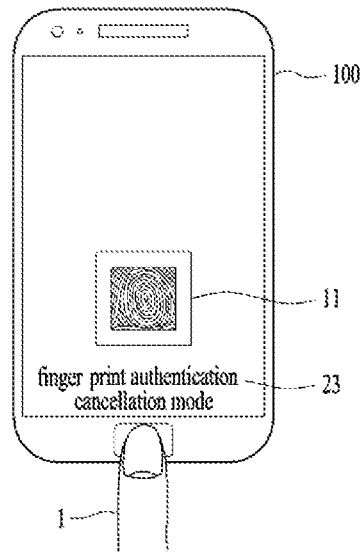
(1)
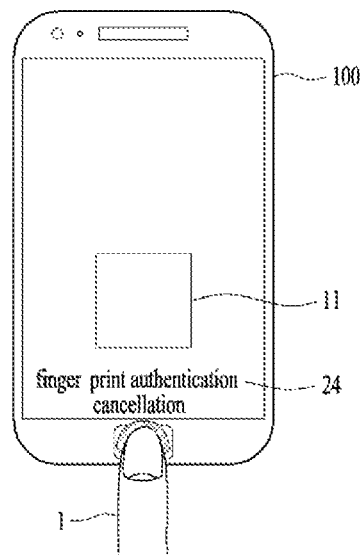
(2)

FIG. 6
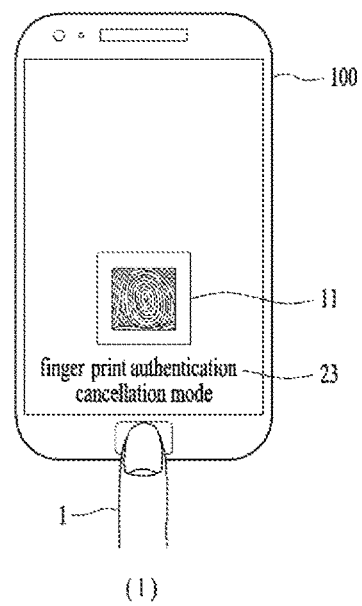
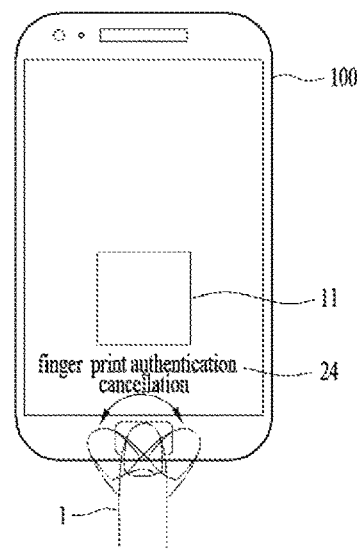

FIG. 9
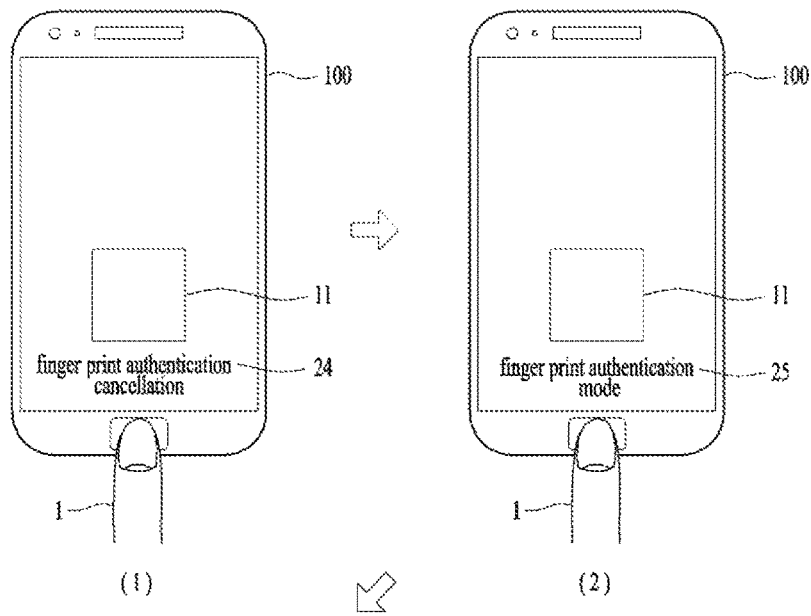
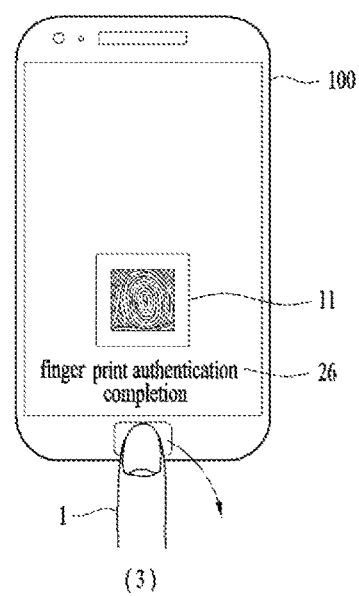

TERMINAL APPARATUS AND CONTROL METHOD FOR TERMINAL APPARATUS

CROSS-REFERENCE TO RELATED APPLICATIONS

This application is the National Stage filing under 35 U.S.C. 371 of International Application No. PCT/KR2014/006653, filed on Jul. 22, 2014, the contents of which are all hereby incorporated by reference herein in its entirety.

TECHNICAL FIELD

The present specification relates to a terminal device and a method of controlling therefor.

BACKGROUND ART

Various terminal devices have been developed in accordance with the development of electronic and communication technologies. Many users have personal terminal devices capable of performing not only a communication function such as phone call, messaging, and the like but also additional functions such as navigating, games, and the like. Most shops, taxis, and buses have terminal devices capable of reading card information and processing payment. A user may store personal information in a personal terminal device or read and write personal information using the terminal device. A terminal device for payment can read and transmit personal information.

As a case of handling personal information handled by a terminal device is increasing, a security problem is emerging. As a method of solving the security problem, it may use a method of authenticating a user using a fingerprint of the user. Since a fingerprint is unique depending on a user, the fingerprint can be an effective security means. Moreover, since the fingerprint is a part of a body, it is portable and has no risk of loss. In general, when authentication is performed using a fingerprint, a user contacts the fingerprint to a fingerprint recognition area of a terminal device. The terminal device recognizes the contacted fingerprint and may be able to perform authentication.

Yet, a case of cancelling authentication may exist in the middle of performing the authentication. Although the authentication is cancelled in the middle of the authentication process, a terminal device can complete the authentication. In this case, a user should perform an authentication cancellation procedure from the beginning. Although the authentication is not completed by the terminal device, in order to cancel the authentication perfectly, the user should perform the authentication cancellation procedure from the beginning. Therefore, there is a necessity for conveniently cancelling fingerprint authentication even if cancellation is performed in the middle of the authentication process.

DISCLOSURE OF THE INVENTION

Technical Problem

Accordingly, an object of the present invention is to address the above-noted and other problems. An object of the present specification is to provide a terminal device capable of cancelling fingerprint authentication in the middle of a fingerprint authentication process and a method of controlling therefor.

Technical Solution

To achieve these and other advantages and in accordance with the purpose of the present invention, as embodied and broadly described, according to one embodiment, a terminal device includes an input unit configured to receive a fingerprint input, a control unit configured to perform an authentication procedure on the inputted fingerprint, and a display unit configured to output a notification message when fingerprint authentication for the inputted fingerprint is completed. In this case, if a contact of the fingerprint is maintained for more than a predetermined first time after the fingerprint authentication is completed, the control unit can set a fingerprint authentication cancellation mode and if a predetermined condition is satisfied, the control unit can cancel the authentication of the fingerprint.

The predetermined condition may correspond to a condition for maintaining the contact of the fingerprint for more than a predetermined second time.

The predetermined second time can be individually set according to a type of content on which the fingerprint authentication is performed or a security level of the content.

The predetermined condition may correspond to a condition for releasing the contact of the fingerprint in the fingerprint authentication cancellation mode.

The predetermined condition may correspond to a condition for pressing the contacted fingerprint with pressure equal to or greater than a predetermined pressure.

Meanwhile, the predetermined pressure can be individually set according to a type of content on which the fingerprint authentication is performed or a security level of the content.

The predetermined condition may correspond to a condition for receiving a rub gesture from the contacted fingerprint.

At least one of direction and count can be set to the rub gesture.

The predetermined condition may correspond to a condition for selecting a cancel button displayed on the display unit.

Meanwhile, if the fingerprint authentication cancellation mode is set, the control unit can generate the cancel button on the display unit.

When the fingerprint maintaining the contact moves to the display unit, the control unit can generate the cancel button on the display unit.

The fingerprint authentication cancellation mode can be set during a predetermined third time or a time until the contact of the fingerprint is released.

When the fingerprint authentication cancellation mode is set during the predetermined third time, if the contact of the fingerprint is maintained for more than the predetermined third time, the control unit can switch a mode from the fingerprint authentication cancellation mode to a fingerprint authentication mode.

If the mode is switched to the fingerprint authentication mode, the control unit can control the display unit to display a notification indicating the fingerprint authentication mode.

If the fingerprint authentication cancellation mode is set, the control unit can control the display unit to display a notification indicating the fingerprint authentication cancellation mode.

If the authentication of the fingerprint is cancelled, the control unit can control the display unit to output a fingerprint authentication cancel message.

To further achieve these and other advantages and in accordance with the purpose of the present invention, according to a different embodiment, a method of controlling a terminal device can include the steps of receiving a fingerprint input, performing an authentication procedure on the inputted fingerprint, outputting a notification message when fingerprint authentication for the inputted fingerprint is completed, and if a contact of the fingerprint is maintained for more than a predetermined first time after the fingerprint authentication is completed, setting a fingerprint authentication cancellation mode and if a predetermined condition is satisfied, cancelling the authentication of the fingerprint.

The predetermined condition may correspond to a condition for maintaining the contact of the fingerprint for more than a predetermined second time.

The predetermined condition may correspond to a condition for releasing the contact of the fingerprint in the fingerprint authentication cancellation mode.

The predetermined condition may correspond to a condition for receiving a rub gesture from the contacted fingerprint.

Advantageous Effects

According to the aforementioned various embodiments, a terminal device and a method of controlling therefor can provide a function capable of cancelling fingerprint authentication in the middle of a fingerprint authentication procedure.

And, a terminal device and a method of controlling therefor can cancel fingerprint authentication using various configured methods.

And, a terminal device and a method of controlling therefor can output a message to inform a user of a fingerprint authentication procedure or a fingerprint cancellation procedure.

DESCRIPTION OF DRAWINGS

FIG. 4 is a diagram for explaining a method of cancelling fingerprint authentication according to a second embodiment;

FIG. 5 is a diagram for explaining a method of cancelling fingerprint authentication according to a third embodiment;

FIG. 6 is a diagram for explaining a method of cancelling fingerprint authentication according to a fourth embodiment;

FIG. 9 is a diagram for explaining an embodiment of switching to a fingerprint authentication mode from a fingerprint authentication cancellation mode;

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

Figure 1:
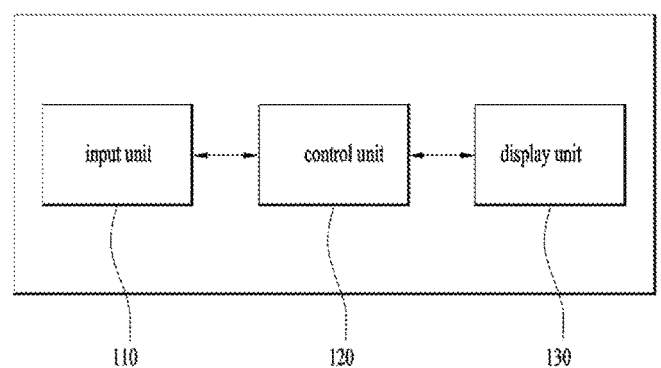
FIG. 1 is a block diagram for a terminal device according to one embodiment.

FIG. 1 is a block diagram for a terminal device according to one embodiment.

Referring to FIG. 1, a terminal device 100 can include an input unit 110, a control unit 120, and a display unit 130.

The input unit 110 can receive a fingerprint. For example, the input unit 110 can be implemented by a sensing module configured to recognize a fingerprint or a scan module capable of scanning a fingerprint. The input unit 110 can be deployed at the top or the bottom of the display unit 130 in a manner of being implemented by a fingerprint recognition layer capable of recognizing a fingerprint. Alternatively, the input unit 110 can be implemented by a fingerprint recognition layer to form a unibody with the display unit 130. Meanwhile, the display unit 130 can be implemented as a single module with a fingerprint recognition layer capable of recognizing a fingerprint and a touch recognition layer capable of receiving a touch. The input unit 110 recognizes a contacted fingerprint and may be able to receive information on the recognized fingerprint. In this specification, a fingerprint and fingerprint information have the same meaning. In particular, an inputted fingerprint corresponds to information on the inputted fingerprint and a registered fingerprint corresponds to information on the registered fingerprint. The input unit 110 may include a keypad for receiving a key input.

The control unit 120 can perform an authentication procedure on an inputted fingerprint. The control unit 120 compares a previously registered fingerprint with the inputted fingerprint to determine whether or not the fingerprints are identical to each other. If it is determined that the fingerprints are identical, the control unit 120 can complete the fingerprint authentication. The terminal device 100 can store information on a fingerprint registered in advance. Or, the control unit 120 may transmit the information on the inputted fingerprint to a server and may ask the server to determine whether or not the inputted fingerprint is matched with the registered fingerprint. If the control unit 120 receives a response indicating that the inputted fingerprint is matched with the registered fingerprint from the server, the control unit 120 can complete the fingerprint authentication.

The control unit 120 can determine whether or not the contact of the inputted fingerprint is maintained after the fingerprint authentication is completed. If it is determined that the contact of the inputted fingerprint is maintained for more than a predetermined first time, the control unit 120 can set a fingerprint authentication cancellation mode. If a predetermined condition is satisfied in the fingerprint authentication cancellation mode, the control unit 120 can cancel the fingerprint authentication.

For example, the predetermined condition for canceling the fingerprint authentication may correspond to a condition for maintaining the contact of the fingerprint for more than a predetermined time. The predetermined condition for canceling the fingerprint authentication may correspond to a condition for releasing the contact of the fingerprint. The predetermined condition for canceling the fingerprint authentication may correspond to a condition for pressing the contacted fingerprint with pressure equal to or greater than a prescribed pressure. The predetermined condition for canceling the fingerprint authentication may correspond to a condition that the contacted fingerprint moves. Or, the predetermined condition for canceling the fingerprint authentication may correspond to a condition for selecting a cancel button displayed on the display unit 130.

In some cases, if the contacted fingerprint is maintained for more than a prescribed time, the control unit 120 may switch a mode from the fingerprint authentication cancellation mode to the fingerprint authentication mode. The control unit 120 can control the display unit 130 to display the currently configured mode to help the understanding of a user. And, the control unit 120 can control the display unit 130 to display a fingerprint authentication completion message, a fingerprint authentication cancellation completion message, or a mode switching message. Detail embodiments are described in the following.

If the authentication on the inputted fingerprint is completed, the display unit 130 can output a notification message. The display unit 130 can display a current mode, a notification of mode switching, a notification of fingerprint authentication completion, or a notification of fingerprint authentication cancellation under the control of the control unit 120. As mentioned in the foregoing description, the display unit 130 may form a unibody with a touch recognition layer configured to receive a touch and a fingerprint recognition layer configured to recognize a fingerprint.

Meanwhile, the terminal device 100 can be implemented in such a form as a TV, a laptop computer, a desktop computer, a monitor, a smartphone, a tablet PC, a navigator, a PMP, a terminal for payment, a terminal for security, a kiosk, or the like.

Figure 2:
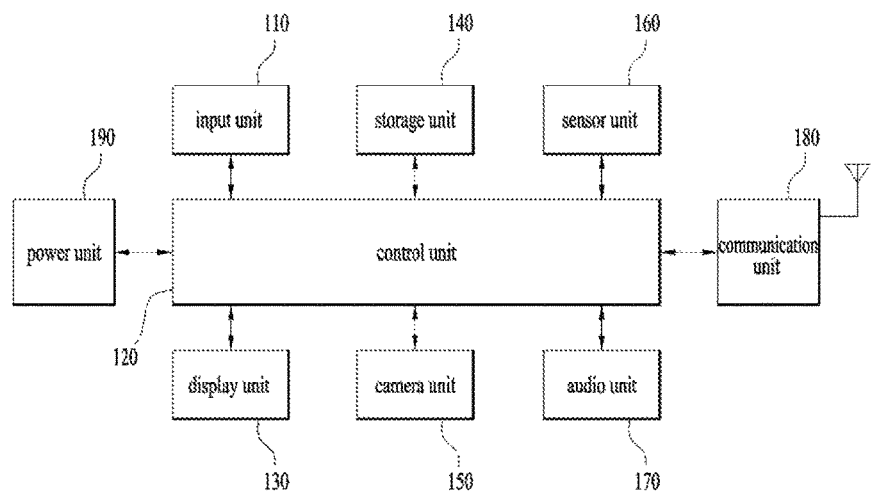
FIG. 2 is a block diagram for a terminal device according to a different embodiment.

FIG. 2 is a block diagram for a terminal device according to a different embodiment.

Referring to FIG. 2, a terminal device can include an input unit 110, a control unit 120, a display unit 130, a storage unit 140, a camera unit 150, a sensor unit 160, an audio unit 170, a communication unit 180, and a power unit 190. Since the input unit 110, the control unit 120, and the display unit 130 are mentioned earlier with reference to FIG. 1, explanation on the input unit 110, the control unit 120, and the display unit 130 is omitted at this time.

The storage unit 140 can store various digital data such as a video, an audio, a picture, a video clip, an application, and the like. The storage unit 140 can register and store a fingerprint to be used for authentication in advance. In addition, the storage unit 140 can store time information for switching to an authentication cancellation mode or an authentication mode, a predetermined condition for canceling fingerprint authentication, and the like. For example, the storage unit 180 can include a RAM, a ROM, a cache memory, a hard disk drive (HDD), a solid state drive (SSD), a CD, a DVD, a Blu-ray disk, a floppy disk (FDD), a magnetic disk, a memory card, a flash memory, a USB memory, and the like.

The camera unit 150 can capture a picture and a video. The camera unit can also be used as a motion sensor or a video sensor. The camera unit 150 can include a plurality of cameras.

The sensor unit 160 can forward an input of a user or environment recognized by a device to the control unit 120 using a sensor mounted on the device. The sensor unit can include a plurality of sensors. For example, a plurality of sensors can include such a sensor as a gravity sensor, a terrestrial magnetic sensor, a motion sensor, a gyro sensor, an acceleration sensor, an inclination sensor, a brightness sensor, an altitude sensor, a smell sensor, a temperature sensor, a depth sensor, a pressure sensor, a bending sensor, an audio sensor, a video sensor, a GPS sensor, a touch sensor, and the like. The input unit 110 can also be implemented using a sensing means or a sensor module. Hence, in a broad sense, the input unit 110 may include the sensor unit 160.

The audio unit 170 can include an audio output means such as a speaker and the like and an audio input means such as a microphone and the like. The audio unit 170 can also be used as an audio sensor. Since the microphone corresponds to an audio input means, the microphone may correspond to an embodiment of the input unit 110.

The communication unit 180 performs communication with the external using various protocols and may be able to transceive data with the external. The communication unit 180 accesses an external network in wired or wireless to transceive digital data with the external network. As an embodiment, the communication unit 180 transmits information on an inputted fingerprint to a server and may be able to receive a response from the server as to whether or not the transmitted fingerprint information is matched with information on a previously registered fingerprint.

The power unit 190 corresponds to a power source connected to a battery or an external power source. The power unit can supply power to a device.

So far, a block diagram of the terminal device has been described. Various embodiments for canceling fingerprint authentication in the terminal device are explained in the following.

Figure 3:
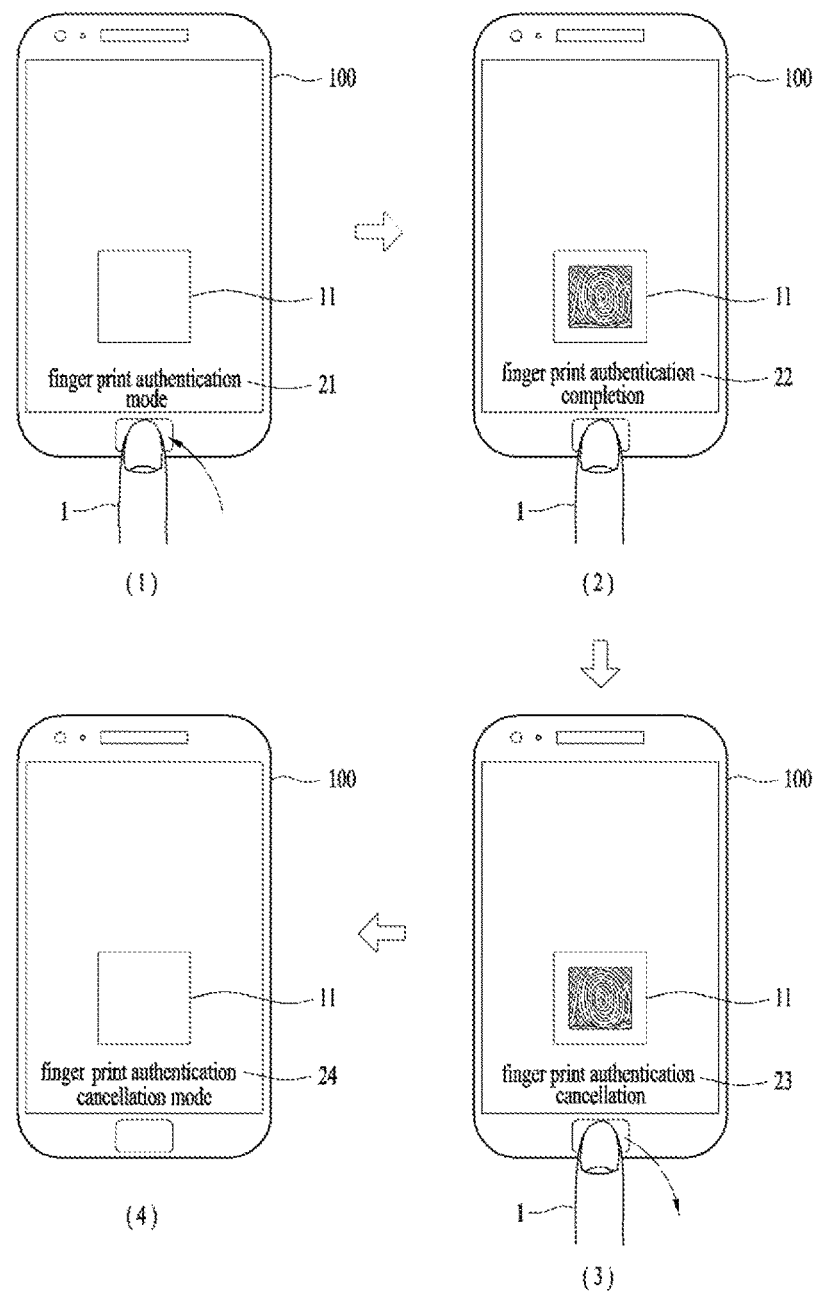
FIG. 3 is a diagram for explaining a method of cancelling fingerprint authentication according to a first embodiment.

FIG. 3 is a diagram for explaining a method of cancelling fingerprint authentication according to a first embodiment.

According to FIG. 3 (1), if a fingerprint 1 of a user is contacted, the terminal device 100 can execute a fingerprint authentication mode. The terminal device 100 can display a notification 21 indicating the fingerprint authentication mode. If the fingerprint authentication mode is executed, the terminal device 100 can display a fingerprint guide window 11 to indicate the inputted fingerprint 1. As a different embodiment, the terminal device 100 executes a fingerprint recognition application according to a command of a user and waits for a fingerprint input of the user.

Referring to FIG. 3 (2), the terminal device 100 can complete the fingerprint authentication. If the fingerprint 1 of the user is contacted for more than a prescribed time, the terminal device 100 extracts the contacted fingerprint 1 and may be able to match the fingerprint with a previously registered fingerprint. The terminal device 100 can display the extracted fingerprint on the fingerprint guide window 11. By doing so, the terminal device 100 can display a fingerprint authentication procedure and information on whether or not the fingerprint is normally extracted to the user.

The registered fingerprint can be stored in the terminal device 100 or can be stored in the server. If the registered fingerprint is stored in the terminal device 100, the terminal device 100 can determine whether or not the inputted fingerprint 1 is matched with the registered fingerprint. If the registered fingerprint is stored in the server, the terminal device 100 transmits the inputted fingerprint 1 to the server and asks the server to determine whether or not the inputted fingerprint is matched with the registered fingerprint. If the inputted fingerprint 1 is matched with the registered fingerprint, the terminal device 100 can determine it as the inputted fingerprint is authenticated. If the fingerprint authentication is completed, the terminal device 100 can display a fingerprint authentication completion notification 22. The user can maintain the contact of the fingerprint.

Referring to FIG. 3 (3), the terminal device 100 can execute a fingerprint authentication cancellation mode. If it is determined that the contact of the fingerprint is maintained for a prescribed time, the terminal device 100 can execute the fingerprint authentication cancellation mode. The terminal device 100 can display a notification 23 indicating the fingerprint authentication cancellation mode. The terminal device 100 can display the inputted fingerprint on the fingerprint guide window 11. Or, if the fingerprint authentication cancellation mode is executed, the terminal device 100 may delete the inputted fingerprint displayed on the fingerprint guide window 11.

The time of maintaining the contact of the fingerprint necessary for executing the fingerprint authentication cancellation mode can be configured by a specific value. For example, the time of maintaining the contact of the fingerprint can be set to 3 seconds. In particular, if the contact of the fingerprint is maintained for three seconds after the fingerprint authentication is completed, the terminal device 100 can execute the fingerprint authentication cancellation mode. The time of maintaining the contact of the fingerprint can be appropriately configured according to the usage of the terminal device 100. In the case of a personal terminal device, the time of maintaining the contact of the fingerprint can be configured by a user.

If a predetermined condition is satisfied after the fingerprint authentication cancellation mode is executed, the terminal device 100 can cancel the authentication of the fingerprint.

Referring to FIG. 3 (4), the terminal device 100 can cancel the authentication of the fingerprint. For example, the predetermined condition may be configured by a condition for releasing the contact of the fingerprint. In the fingerprint authentication cancellation mode, the terminal device 100 can detect that the contact of the fingerprint is released. If the contact of the fingerprint is released, the terminal device 100 can cancel the authenticated fingerprint. The terminal device 100 can display a fingerprint authentication cancel notification 24. If the terminal device 100 displays the inputted fingerprint on the fingerprint guide window 11 until the fingerprint authentication is cancelled, the terminal device 100 can delete the fingerprint displayed on the fingerprint guide window 11 while cancelling the fingerprint authentication. The terminal device 100 may cancel the authenticated fingerprint in the process followed by the fingerprint authentication using the method mentioned in FIG. 3.

FIG. 4 is a diagram for explaining a method of cancelling fingerprint authentication according to a second embodiment.

Referring to FIG. 4 (1), the terminal device 100 can execute a fingerprint authentication cancellation mode. A process of authenticating a fingerprint of the terminal device 100 is identical to what is mentioned earlier in FIG. 3. If it is determined that the contact of the fingerprint is maintained for a prescribed time, the terminal device 100 can execute the fingerprint authentication cancellation mode. The terminal device 100 can display a notification 23 indicating the fingerprint authentication cancellation mode. The terminal device 100 can display the inputted fingerprint on the fingerprint guide window 11.

The time of maintaining the contact of the fingerprint necessary for executing the fingerprint authentication cancellation mode can be configured by a specific value. The time of maintaining the contact of the fingerprint can be appropriately configured according to the usage of the terminal device 100. In the case of a personal terminal device, the time of maintaining the contact of the fingerprint can be configured by a user. If a predetermined condition is satisfied after the fingerprint authentication cancellation mode is executed, the terminal device 100 can cancel the authentication of the fingerprint.

Referring to FIG. 4 (2), the terminal device 100 can cancel the authentication of the fingerprint. For example, the predetermined condition may be configured by a condition for maintaining the contact of the fingerprint for more than a prescribed time. The terminal device 100 executes the fingerprint authentication cancellation mode and can detect the time of maintaining the contact of the fingerprint. In the fingerprint authentication cancellation mode, if it is determined as the contact of the fingerprint is maintained for more than a predetermined time, the terminal device 100 can cancel the authenticated fingerprint. As an embodiment, the predetermined time can be set to 5 seconds. If the contact of the fingerprint is maintained for more than 5 seconds after the fingerprint authentication cancellation mode is executed, the terminal device 100 can cancel the authenticated fingerprint. The predetermined time for canceling the authenticated fingerprint can be set individually according to a type of content or a security level of the content that performs the fingerprint authentication.

For example, if a content having a high security level is executed, the terminal device can set the time of maintaining the contact of the fingerprint for canceling the authenticated fingerprint to 2 seconds. If a content having a low security level is executed, the same terminal device can set the time of maintaining the contact of the fingerprint for canceling the authenticated fingerprint to 5 seconds. As a different embodiment, if content requiring careful determination is executed, the terminal device may set the time of maintaining the contact of the fingerprint to 7 seconds. If general content is executed, the terminal device may set the time of maintaining the contact of the fingerprint to 3 seconds. The aforementioned concrete time of maintaining the contact of the fingerprint is just one embodiment. The time of maintaining the contact of the fingerprint can be configured in various ways.

The terminal device 100 can display a fingerprint authentication cancel notification 24. If the terminal device 100 displays the inputted fingerprint on the fingerprint guide window 11 until the fingerprint authentication is canceled, the terminal device 100 can delete the fingerprint displayed on the fingerprint guide window 11 while cancelling the fingerprint authentication.

FIG. 5 is a diagram for explaining a method of cancelling fingerprint authentication according to a third embodiment.

Referring to FIG. 5 (1), the terminal device 100 can execute a fingerprint authentication cancellation mode. If it is determined that the contact of the fingerprint is maintained for a prescribed time, the terminal device 100 can execute the fingerprint authentication cancellation mode. The terminal device 100 can display a notification 23 indicating the fingerprint authentication cancellation mode. The terminal device 100 can display the inputted fingerprint on the fingerprint guide window 11.

The time of maintaining the contact of the fingerprint necessary for executing the fingerprint authentication cancellation mode can be configured by a specific value. The time of maintaining the contact of the fingerprint can be appropriately configured according to the usage of the terminal device 100. In the case of a personal terminal device, the time of maintaining the contact of the fingerprint can be configured by a user. If a predetermined condition is satisfied after the fingerprint authentication cancellation mode is executed, the terminal device 100 can cancel the authentication of the fingerprint.

Referring to FIG. 5 (2), the terminal device 100 can cancel the authentication of the fingerprint. For example, the predetermined condition may be configured by a condition for pressing the contact of the fingerprint with pressure equal to or greater than prescribed pressure. The input unit can detect the pressure of the contacted fingerprint 1. Hence, the input unit can include a pressure detection sensor capable of detecting the pressure. The input unit and the pressure detection sensor can be implemented as a unibody or the pressure detection sensor can be deployed at the top or the bottom of the input unit in a manner of being separated from the input unit.

The terminal device 100 executes the fingerprint authentication cancellation mode and can detect the pressure of the contacted fingerprint 1. In the fingerprint authentication cancellation mode, if the pressure of the contacted fingerprint 1 equal to or greater than a predetermined pressure is detected, the terminal device 100 can cancel the authenticated fingerprint. The predetermined pressure for cancelling the authenticated fingerprint can be set individually according to a type of content or a security level of the content that performs the fingerprint authentication.

For example, if a content having a high security level is executed, the terminal device can set the pressure for cancelling the authenticated fingerprint to be relatively high. If a content having a low security level is executed, the same terminal device can set the pressure for cancelling the authenticated fingerprint to be relatively low. The terminal device can detect the pressure of the contacted fingerprint according to several discrete levels. The terminal device can individually set a pressure level with a discrete level according to a type or a security level of content.

The terminal device 100 can display a fingerprint authentication cancel notification 24. If the terminal device 100 displays the inputted fingerprint on the fingerprint guide window 11 until the fingerprint authentication is canceled, the terminal device 100 can delete the fingerprint displayed on the fingerprint guide window 11 while cancelling the fingerprint authentication.

FIG. 6 is a diagram for explaining a method of cancelling fingerprint authentication according to a fourth embodiment.

Referring to FIG. 6 (1), the terminal device 100 can execute a fingerprint authentication cancellation mode. If it is determined that the contact of the fingerprint is maintained for a prescribed time, the terminal device 100 can execute the fingerprint authentication cancellation mode. The terminal device 100 can display a notification 23 indicating the fingerprint authentication cancellation mode. The terminal device 100 can display the inputted fingerprint on the fingerprint guide window 11.

The time of maintaining the contact of the fingerprint necessary for executing the fingerprint authentication cancellation mode can be configured by a specific value. The time of maintaining the contact of the fingerprint can be appropriately configured according to the usage of the terminal device 100. In the case of a personal terminal device, the time of maintaining the contact of the fingerprint can be configured by a user. If a predetermined condition is satisfied after the fingerprint authentication cancellation mode is executed, the terminal device 100 can cancel the authentication of the fingerprint.

Referring to FIG. 6 (2), the terminal device 100 can cancel the authentication of the fingerprint. For example, the predetermined condition may be configured by a condition for receiving a rub gesture received by the terminal device 100 from the contacted fingerprint. The rub gesture may correspond to a gesture that the contacted fingerprint moves in random direction while maintaining the contact of the contacted fingerprint 1. The rub gesture is just an embodiment only. Various gestures can be set. The terminal device 100 executes the fingerprint authentication cancellation mode and can detect the movement of the contacted fingerprint. If the terminal device 100 detects the rub gesture in the fingerprint authentication cancellation mode, the terminal device 100 can cancel the authenticated fingerprint. The rub gesture for cancelling the authenticated fingerprint can be set together with at least one of a direction and a count.

For example, the rub gesture for cancelling the authenticated fingerprint can be configured by a rub gesture rubbing two times in left direction, a rub gesture rubbing in right direction and left direction one time each, or a rub gesture rubbing in left direction. If a rub gesture includes direction only, the rub gesture is identical to a rub gesture rubbing in the direction included in the rub gesture.

The terminal device 100 can display a fingerprint authentication cancel notification 24. If the terminal device 100 displays the inputted fingerprint on the fingerprint guide window 11 until the fingerprint authentication is canceled, the terminal device 100 can delete the fingerprint displayed on the fingerprint guide window 11 while cancelling the fingerprint authentication.

Figure 7:
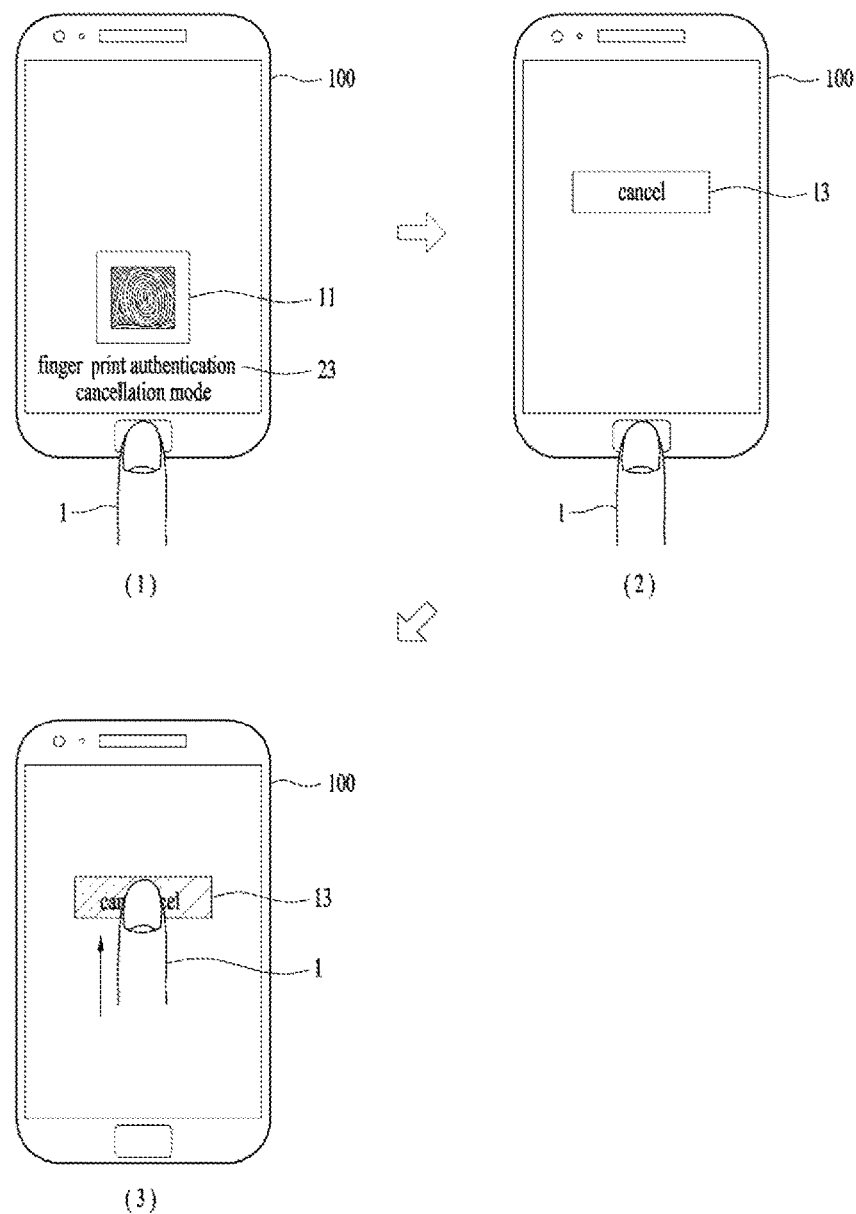
FIG. 7 is a diagram for explaining a method of cancelling fingerprint authentication according to a fifth embodiment.

FIG. 7 is a diagram for explaining a method of cancelling fingerprint authentication according to a fifth embodiment.

Referring to FIG. 7 (1), the terminal device 100 can execute a fingerprint authentication cancellation mode. If it is determined that the contact of the fingerprint is maintained for a prescribed time, the terminal device 100 can execute the fingerprint authentication cancellation mode. The terminal device 100 can display a notification 23 indicating the fingerprint authentication cancellation mode. The terminal device 100 can display the inputted fingerprint on the fingerprint guide window 11.

The time of maintaining the contact of the fingerprint necessary for executing the fingerprint authentication cancellation mode can be configured by a specific value. The time of maintaining the contact of the fingerprint can be appropriately configured according to the usage of the terminal device 100. In the case of a personal terminal device, the time of maintaining the contact of the fingerprint can be configured by a user. If a predetermined condition is satisfied after the fingerprint authentication cancellation mode is executed, the terminal device 100 can cancel the authentication of the fingerprint. For example, the predetermined condition can be configured by a condition for selecting a cancel button 13 generated on the display unit.

Referring to FIG. 7 (2), the terminal device 100 can generate and display the cancel button 13. If the fingerprint authentication cancellation mode is executed, the terminal device 100 can generate the cancel button 13 on the display unit. The cancel button 13 corresponds to a fingerprint authentication cancel button. If the cancel button 13 is selected, the terminal device 100 can cancel the authentication of the fingerprint.

Referring to FIG. 7 (3), the terminal device 100 can cancel the authentication of the fingerprint. The input unit configured to receive the fingerprint and the display unit may form a unibody. In particular, the terminal device 100 can include a touch-sensitive display module and a fingerprint detection display module. If the input unit and the display unit are implemented as a unibody, the cancel button can be selected while the contact of the fingerprint is maintained.

As an embodiment, since the terminal device 100 generates the cancel button 13 on the display unit while executing the fingerprint authentication cancellation mode, the display of the cancel button 13 can be maintained even if the contact of the fingerprint is released. Therefore, the cancel button 13 can be selected after the contact of the fingerprint is released for a prescribed time. The terminal device 100 can display the cancel button 13 for a prescribed time irrespective of the contact of the fingerprint. If the cancel button 13 is selected within the prescribed time during which the cancel button 13 is displayed, the terminal device 100 can cancel the fingerprint authentication. Or, if the contact of the fingerprint is released after the prescribed time elapsed, the terminal device can cancel the fingerprint authentication cancellation mode and complete the fingerprint authentication.

As a different embodiment, the terminal device 100 may display the cancel button 13 as a fingerprint authentication cancel button and can additionally display a previous step maintenance button. The previous step maintenance button may correspond to a button for maintaining the fingerprint authentication. Hence, if the fingerprint authentication cancel button is selected, the terminal device 100 can cancel the fingerprint authentication irrespective of the release of the contact of the fingerprint. If the previous step maintenance button is selected, the terminal device can complete the fingerprint authentication.

Figure 8:
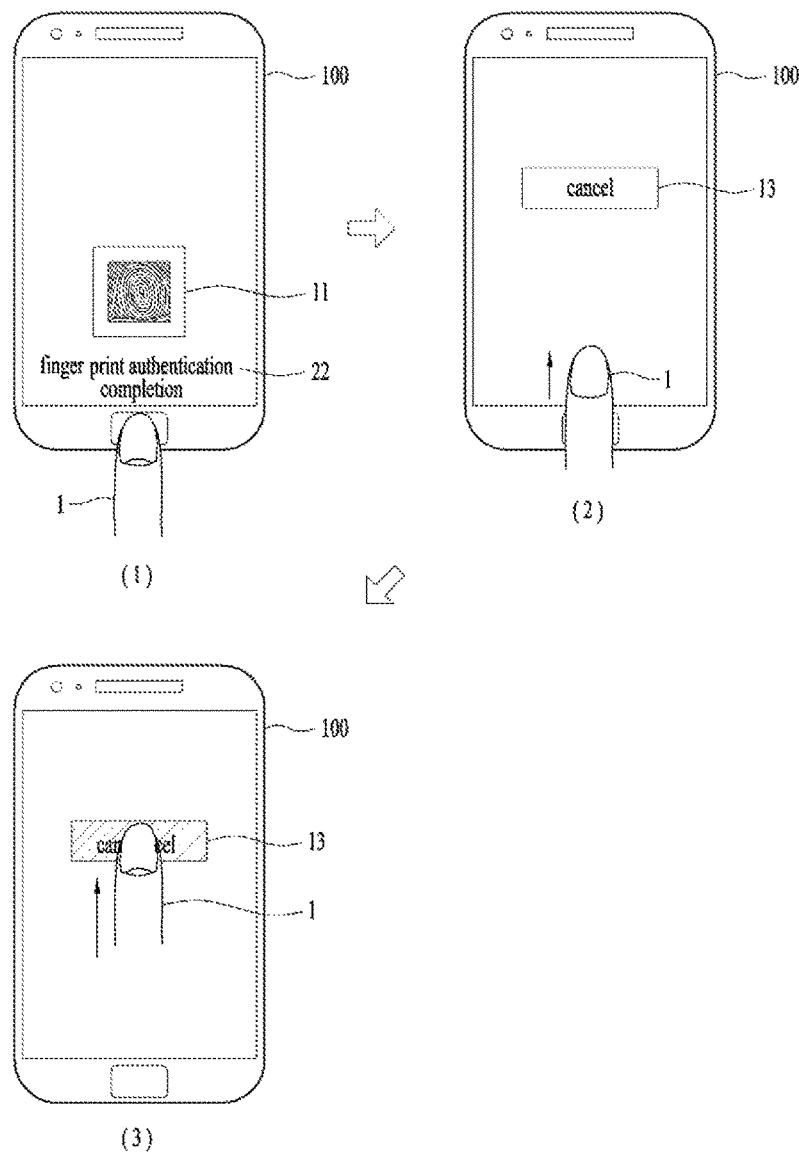
FIG. 8 is a diagram for explaining a method of cancelling fingerprint authentication according to a sixth embodiment.

FIG. 8 is a diagram for explaining a method of cancelling fingerprint authentication according to a sixth embodiment.

Referring to FIG. 8 (1), the terminal device 100 can complete the fingerprint authentication. If the fingerprint 1 of the user is contacted for more than a prescribed time, the terminal device 100 extracts the contacted fingerprint 1 and may be able to match the contacted fingerprint with a registered fingerprint. The terminal device 100 can display the extracted fingerprint on the fingerprint guide window 11. By doing so, the terminal device 100 can display a fingerprint authentication process and information on whether or not a fingerprint is normally extracted to the user.

The registered fingerprint may be stored in the terminal device 100 or a server. If the registered fingerprint is stored in the terminal device 100, the terminal device 100 can determine whether or not the inputted fingerprint 1 is matched with the registered fingerprint. If the registered fingerprint is stored in the server, the terminal device 100 transmits the inputted fingerprint 1 to the server and can ask the server to determine whether or not the inputted fingerprint is matched with the registered fingerprint. If the inputted fingerprint 1 is matched with the registered fingerprint, the terminal device 100 can determine it as the fingerprint is authenticated. If the fingerprint authentication is completed, the terminal device 100 can display a fingerprint authentication completion notification 22. A user can maintain the contact of the fingerprint.

Referring to FIG. 8 (2), the terminal device 100 can generate and display a cancel button 13. The input unit configured to receive the fingerprint and the display unit may form a unibody. In particular, the terminal device 100 can include a touch-sensitive display module and a fingerprint detection display module. When the input unit and the display unit are implemented as a unibody, if the contact of the fingerprint 1 of the user moves to the top of the display unit while maintaining the contact, the terminal device 100 can generate and display the cancel button 13 on the display unit.

As an embodiment, although the input unit and the display unit of the terminal device 100 are separately implemented, the terminal device 100 can determine it as the contact of the fingerprint is not released in a specific situation. For example, although the contact of the fingerprint is released for a short period of time (e.g., instantaneous time), the terminal device 100 can determine it as the contact of the fingerprint is maintained. In particular, if the contact of the fingerprint is released for more than a predetermined period of time (e.g., one second), the terminal device 100 can determine it as the contact is released. Accordingly, the terminal device 100 can determine an instantaneous contact release, which occurs when the fingerprint 1 of the user moves from the input unit to the display unit, as the contact is maintained. When the fingerprint 1 moves to the display unit while maintaining the contact under a specific condition, the terminal device 100 can generate and display the cancel button 13 on the display unit. The terminal device 100 can execute the fingerprint authentication cancellation mode while generating the cancel button 13. If a predetermined condition is satisfied after the fingerprint authentication cancellation mode is executed, the terminal device 100 can cancel the authentication of the fingerprint.

Referring to FIG. 8 (3), the terminal device 100 can cancel the authentication of the fingerprint. For example, the predetermined condition can be configured by a condition for selecting the cancel button 13 generated on the display unit. If the fingerprint 1, which has moved to the display unit while maintaining the contact, selects the generated cancel button 13, the terminal device 100 can cancel the authentication of the fingerprint.

If the authentication of the fingerprint is canceled, the terminal device 100 can output a fingerprint authentication cancel message. In addition, when the fingerprint authentication mode or the fingerprint authentication cancellation mode is set, the terminal device 100 may output a message related to the mode. The terminal device 100 may switch back to the fingerprint authentication mode from the fingerprint authentication cancellation mode.

FIG. 9 is a diagram for explaining an embodiment of switching to a fingerprint authentication mode from a fingerprint authentication cancellation mode.

Referring to FIG. 9 (1), the terminal device 100 can cancel the authentication of the fingerprint. The terminal device 100 executes the fingerprint authentication cancellation mode and can cancel the authentication of the fingerprint according to a prescribed condition. For example, the prescribed condition may correspond to a condition for releasing the contact of the fingerprint, a condition for maintaining the contact for more than a prescribed time, a condition for pressing the contacted fingerprint with pressure equal to or greater than a prescribed pressure, a condition for moving the contacted fingerprint, a condition for selecting a cancel button generated on the display unit, or the like. If the terminal device 100 determines that the prescribed condition is satisfied, the terminal device 100 can cancel the authenticated fingerprint. The terminal device 100 can display a fingerprint authentication cancel notification 24. If the terminal device 100 displays the inputted fingerprint on the fingerprint guide window 11 until the fingerprint authentication is canceled, the terminal device 100 can delete the fingerprint displayed on the fingerprint guide window 11 while cancelling the fingerprint authentication.

Referring to FIG. 9 (2), the terminal device 100 can switch a mode from the fingerprint authentication cancellation mode to the fingerprint authentication mode. The terminal device 100 can detect whether or not the contact of the fingerprint is maintained even after the authentication of the fingerprint is canceled. If the terminal device 100 detects a fingerprint that maintains the contact for more than a prescribed time after the fingerprint authentication is canceled, the terminal device 100 can switch to the fingerprint authentication mode. The terminal device 100 can display a notification 25 indicating that the terminal device 10 has switched to the fingerprint authentication mode. After the switching, if the terminal device 100 detects a fingerprint that maintains the contact for more than a prescribed time, the terminal device 100 can complete the fingerprint authentication.

Referring to FIG. 9 (3), the terminal device 100 can complete the fingerprint authentication. If a fingerprint of a user is contacted for more than a prescribed time, the terminal device 100 extracts the contacted fingerprint 1 and may be able to match the contacted fingerprint 1 with a registered fingerprint. The terminal device 100 can display the extracted fingerprint on the fingerprint guide window 11. By doing so, the terminal device 100 can display a fingerprint authentication process and information on whether or not a fingerprint is normally extracted to the user. If the fingerprint authentication is completed, the terminal device 100 can display a fingerprint authentication completion notification 26.

Various embodiments for completing the fingerprint authentication cancellation or the fingerprint authentication can be explained on the basis of time.

Figure 10:
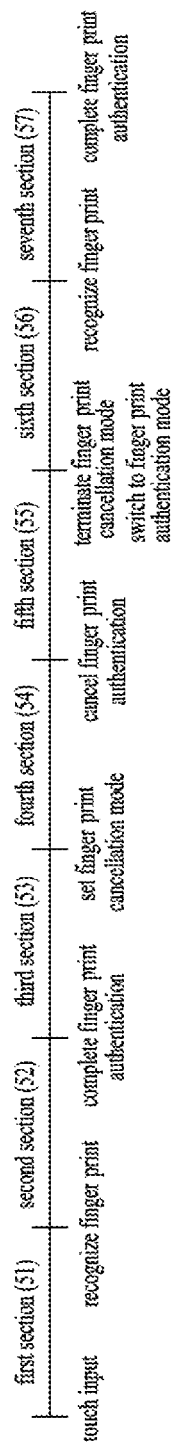
FIG. 10 is a diagram for explaining an embodiment of an operation associated with fingerprint authentication based on time.

FIG. 10 is a diagram for explaining an embodiment of an operation associated with fingerprint authentication based on time.

Referring to FIG. 10, a terminal device can receive a touch input of a fingerprint. When time of a first section 51 has elapsed, the terminal device can start to recognize the fingerprint. The time of the first section 51 may correspond to time for the terminal device to receive the touch input and start to recognize the fingerprint. The time of the first section 51 may correspond to a very short period of time.

The terminal device starts the fingerprint recognition. When time of a second section 52 has elapsed, the terminal device may complete the fingerprint authentication. The time of the second section 52 may vary depending on performance of the terminal device, a fingerprint recognition method, and the like.

The terminal device can detect the contact of the fingerprint even after the fingerprint authentication is completed. If the contact of the fingerprint is maintained for time of a third section 53, the terminal device can execute the fingerprint authentication cancellation mode. The time of the third section 53 corresponds to time for setting the fingerprint authentication cancellation mode and can be appropriately configured. Or, the time of the third section 53 can be randomly configured by a user or can be configured according to a type of content. The fingerprint authentication cancellation mode can be maintained until the contact of the fingerprint is released. In particular, the fingerprint authentication cancellation mode can be configured by a time period until the contact of the fingerprint is released. Or, the fingerprint authentication cancellation mode can be maintained for a prescribed time. In particular, the fingerprint authentication cancellation mode can be configured for a predetermined time period. In this case, although the contact of the fingerprint is released, the terminal device can maintain the fingerprint authentication cancellation mode.

When the terminal device sets the fingerprint authentication cancellation mode and time of a fourth section 54 elapses, the fingerprint authentication can be canceled. The time of the fourth section 54 can be differently configured depending on a type of content or a security level of the content.

If the fingerprint authentication is canceled and the contact of the fingerprint is maintained for time of a fifth section 55, the terminal device can terminate the fingerprint authentication cancellation mode and switch to the fingerprint authentication mode. The terminal device can maintain the fingerprint authentication cancellation mode for the time of the fourth section 54 and the fifth section 55. In particular, the fingerprint authentication cancellation mode can be configured for the time of the fourth section 54 and the fifth section 55. If a condition for terminating the fingerprint authentication cancellation mode is configured by a condition for releasing the contact of the fingerprint, the fingerprint authentication cancellation mode can be terminated when the contact of the fingerprint is released.

If a mode is switched to the fingerprint authentication mode and the contact of the fingerprint is maintained for time of a sixth interval 56, the terminal device can recognize a fingerprint again. The terminal device extracts the fingerprint for the time of the seventh section 57 and can match the extracted fingerprint with a registered fingerprint. When the matching is completed, the terminal device can complete the fingerprint authentication.

Whenever the fingerprint authentication mode, the fingerprint authentication cancellation mode, and the fingerprint authentication completion are executed, the terminal device can display a notification.

Figure 11:
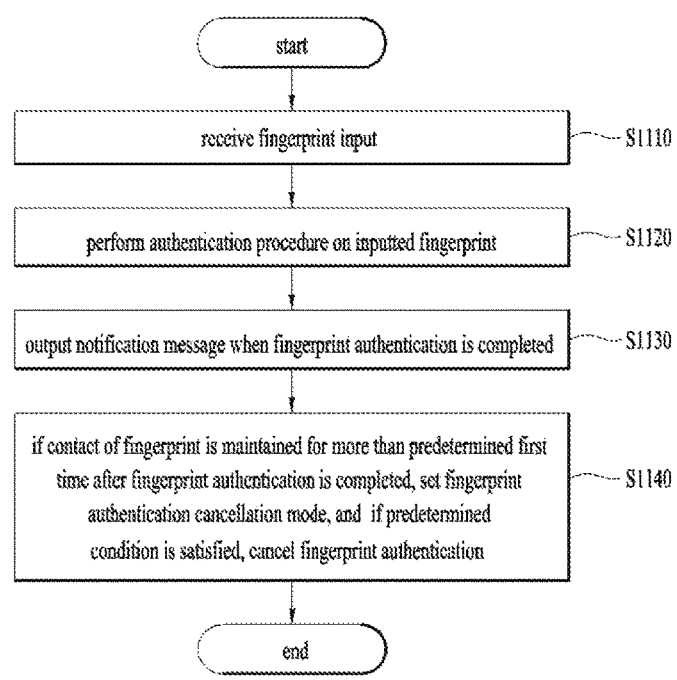
FIG. 11 is a flowchart for a method of controlling a terminal device according to one embodiment.

FIG. 11 is a flowchart for a method of controlling a terminal device according to one embodiment.

According to FIG. 11, the terminal device receives a fingerprint [S1110]. The input unit configured to receive the fingerprint may be implemented as a separate unit from the display unit, may be deployed at the top or the bottom of the display unit, or may form a unibody with the display unit.

The terminal device performs an authentication procedure on the inputted fingerprint [S1120]. Authentication may correspond to a process of extracting the inputted fingerprint and comparing the extracted fingerprint with a registered fingerprint. The registered fingerprint can be stored in the terminal device or a server.

The terminal device outputs a notification message when the fingerprint authentication is completed [S1130]. The terminal device can output a notification message when the fingerprint authentication of the inputted fingerprint is completed.

If the contact of the fingerprint is maintained for a predetermined first time after the fingerprint authentication is completed, the terminal device sets a fingerprint authentication cancellation mode. If a predetermined condition is satisfied, the terminal device can cancel the authentication of the fingerprint [S1140]. For example, the predetermined condition may include a condition for releasing the contact of the fingerprint, a condition for maintaining the contact of the fingerprint for more than a predetermined time, a condition for pressing the contacted fingerprint with pressure equal to or greater than a prescribed pressure, a condition for moving the contacted fingerprint, a condition for selecting a button displayed on the display unit, and the like. As an embodiment, the movement of the contacted fingerprint may correspond to a rub gesture.

The terminal device and the method of controlling therefor according to the present specification may be non-limited by the configuration and the method of the aforementioned embodiments. All or a part of the embodiments can be selectively combined to make various modifications.

Meanwhile, the method of controlling the terminal device according to the present specification can be implemented by software in a recording media readable by a processor installed in the terminal device. The recording media readable by the processor includes all kinds of recording devices in which data readable by the processor are stored. Examples of possible processor-readable mediums include ROM, RAM, CD-ROM, a magnetic tape, a floppy disk, an optical data storage device, the other types of storage mediums presented herein, and combinations thereof. If desired, the processor-readable medium may be realized in the form of a carrier wave (for example, a transmission over the Internet). And, the recording media readable by the processor are distributed to computer systems connected with each other via network and codes readable by the processor can be stored and executed in a distributed scheme.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

MODE FOR INVENTION

INDUSTRIAL APPLICABILITY

The present invention is usable for a terminal device and can be used for industry having repeatability.

What is claimed is:

1. A terminal device, comprising:
an input unit configured to receive a fingerprint input;
a display comprising a touchscreen; and
a controller operably coupled with the input unit and the display and configured to:
perform an authentication procedure in response to the fingerprint input;
cause the display to display a notification message when fingerprint authentication for a finger associated with the fingerprint input is completed;
if a contact of the finger is maintained for more than a predetermined first time after the fingerprint authentication is completed, set a fingerprint authentication cancellation mode;
cause the display to display a cancel button when the finger moves from the input unit to the touchscreen during the fingerprint authentication cancellation mode, continuous contact maintained by the finger with the input unit or the touchscreen when the finger moves from the input unit to the touchscreen; and
cancel the fingerprint authentication in response to selection of the displayed cancel button.

2. The terminal device of claim 1, wherein the controller is further configured to generate the cancel button on the display unit when the fingerprint authentication cancellation mode is set.

3. The terminal device of claim 1, wherein the set fingerprint authentication cancellation mode is terminated when the contact of the finger is no longer maintained.

4. The terminal device of claim 3, wherein the controller is further configured to switch a mode from the fingerprint authentication cancellation mode to a fingerprint authentication mode when the contact of the finger is maintained for more than a predetermined second time after the predetermined first time.

5. The terminal device of claim 4, wherein the controller is further configured to cause the display to display a notification indicating the fingerprint authentication mode when the mode is switched to the fingerprint authentication mode.

6. The terminal device of claim 4, wherein the controller is further configured to cause the display to display a notification indicating the fingerprint authentication cancellation mode when the fingerprint authentication cancellation mode is set.

7. The terminal device of claim 1, wherein the controller is further configured to cause the display to display a fingerprint authentication cancel message when the authentication of the fingerprint is cancelled.

8. A method of controlling a terminal device, the method comprising:
receiving a fingerprint input via an input unit;
performing an authentication procedure in response to the fingerprint input;
displaying a notification message via a display comprising a touchscreen when fingerprint authentication for a finger associated with the fingerprint input is completed;
if a contact of the finger is maintained for more than a predetermined first time after the fingerprint authentication is completed, setting a fingerprint authentication cancellation mode;
displaying a cancel button via the display when the finger moves from the input unit to the touchscreen during the fingerprint authentication cancellation mode, continuous contact maintained by the finger with the input unit or the touchscreen when the finger moves from the input unit to the touchscreen; and
cancelling the fingerprint authentication in response to selection of the displayed cancel button.

9. The terminal device of claim 1, wherein the controller is further configured to extract a fingerprint when the fingerprint input is received via the input unit for threshold time such that the extracted fingerprint is compared with a registered fingerprint stored in a memory.

10. The terminal device of claim 9, wherein the controller is further configured to cause the display to display a fingerprint guide window including the extracted fingerprint to indicate the authentication procedure being performed.

11. The terminal device of claim 10, wherein the fingerprint authentication is completed when the extracted fingerprint matches the registered fingerprint.

12. The terminal device of claim 1, wherein the input unit and the display form a unibody.

13. The terminal device of claim 1, wherein the cancel button is selected by the finger continuously moving toward the cancel button on the touchscreen after the cancel button is displayed.

14. The method of claim 8, wherein the set fingerprint authentication cancellation mode is terminated when the contact of the finger is no longer maintained.

15. The method of claim 14, further comprising switching a mode from the fingerprint authentication cancellation mode to a fingerprint authentication mode when the contact of the finger is maintained for more than a predetermined second time after the predetermined first time.

16. The method of claim 8, further comprising extracting a fingerprint when the fingerprint input is received via the input unit for threshold time such that the extracted fingerprint is compared with a registered fingerprint stored in a memory.

17. The method of claim 16, further comprising displaying, via the display, a fingerprint guide window including the extracted fingerprint to indicate the authentication procedure being performed.

18. The method of claim 17, wherein the fingerprint authentication is completed when the extracted fingerprint matches the registered fingerprint.

19. The method of claim 8, wherein the input unit and the display form a unibody.

20. The method of claim 8, wherein the cancel button is selected by the finger continuously moving toward the cancel button on the touchscreen after the cancel button is displayed.

\* \* \* \* \*